(12) United States Patent
Zhou et al.

(10) Patent No.: US 10,619,773 B2
(45) Date of Patent: Apr. 14, 2020

(54) CONNECTING MECHANISM OF A FLEXIBLE PIPE AND AN OUTLET DEVICE

(71) Applicant: XIAMEN SOLEX HIGH-TECH INDUSTRIES CO., LTD., Xiamen, Fujian (CN)

(72) Inventors: Quanbing Zhou, Fujian (CN); Wenxing Chen, Fujian (CN); Feng Fu, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 40 days.

(21) Appl. No.: 15/374,471

(22) Filed: Dec. 9, 2016

(65) Prior Publication Data

US 2017/0205004 A1    Jul. 20, 2017

(30) Foreign Application Priority Data

Jan. 19, 2016  (CN) .......................... 2016 1 0033455

(51) Int. Cl.
 *F16L 27/073*  (2006.01)
 *B05B 15/654*  (2018.01)
(52) U.S. Cl.
 CPC ........... *F16L 27/073* (2013.01); *B05B 15/654* (2018.02)
(58) Field of Classification Search
 CPC ........ F16L 27/02; F16L 27/023; F16L 27/073
 USPC ...................... 285/261, 263, 271; 239/587.1
 See application file for complete search history.

(56) References Cited

U.S. PATENT DOCUMENTS

| 2,369,849 | A | * | 2/1945 | Phillips | F16L 59/16 174/21 JC |
| 2,506,096 | A | * | 5/1950 | Marshall | F16L 27/04 285/266 |
| 4,674,687 | A | * | 6/1987 | Smith | B05B 1/1645 239/447 |
| 4,903,943 | A | * | 2/1990 | Hochstrasser | E03C 1/23 251/229 |
| 5,865,378 | A | * | 2/1999 | Hollinshead | E03C 1/021 239/587.1 |
| 6,220,636 | B1 | * | 4/2001 | Veloskey | A47L 9/242 285/261 |
| 6,264,122 | B1 | * | 7/2001 | Perdreau | A61H 33/027 239/434 |

(Continued)

FOREIGN PATENT DOCUMENTS

CN    102947517 B    10/2014
EP     2582889 A1    4/2013

*Primary Examiner* — Aaron M Dunwoody
(74) *Attorney, Agent, or Firm* — Cooper Legal Group, LLC

(57) ABSTRACT

A connecting mechanism of a flexible pipe and an outlet device, includes a pipe fixing seat fixedly connected to a flexible pipe, an outlet fixing seat fixedly connected to an outlet device and a joint having a ball joint. Water in the flexible pipe is deflected to the outlet device by the pipe fixing seat and the joint. The joint is fixedly connected to the outlet fixing seat and the outlet fixing seat is disposed with a self-lock surface surrounding the ball joint. An end of the pipe fixing seat is concaved with an assembly groove. The groove opening of the assembly groove protrudes inwardly with an anti-off portion. The ball joint is assembled in the assembly groove by the elastic deformation of the end portion of the pipe fixing seat. The anti-off portion connects the ball joint to the pipe fixing seat.

18 Claims, 5 Drawing Sheets

(56) References Cited

U.S. PATENT DOCUMENTS

| | | | |
|---|---|---|---|
| 6,491,238 B1* | 12/2002 | Swanson | A61H 33/6063 |
| | | | 239/251 |
| 7,188,869 B2* | 3/2007 | Garraffa | B63C 11/2227 |
| | | | 128/202.27 |
| 7,712,793 B1* | 5/2010 | Garraffa | F16L 27/06 |
| | | | 285/148.15 |
| 8,146,954 B2* | 4/2012 | Su | F16C 11/0619 |
| | | | 285/261 |
| 2007/0046023 A1* | 3/2007 | Hung | F16L 27/04 |
| | | | 285/261 |
| 2011/0309167 A1* | 12/2011 | Grether | E03C 1/021 |
| | | | 239/587.4 |
| 2011/0309168 A1* | 12/2011 | Grether | E03C 1/021 |
| | | | 239/587.4 |

* cited by examiner

CONNECTING MECHANISM OF A FLEXIBLE PIPE AND AN OUTLET DEVICE

FIELD OF THE INVENTION

The present invention relates to waterway connecting, especially to a connecting mechanism of a flexible pipe and an outlet device.

BACKGROUND OF THE INVENTION

Existing connecting mechanism of a flexible pipe and an outlet device, for example, CN102947517B and EP2582889, disclosed is a hand spraying component, which has a hand sprayer, the hand sprayer is connected to the flexible pipe by a connecting device, the connecting device of the hand sprayer and the flexible pipe comprises a flexible joint with ball joint, the ball joint has a first movable joint and a second movable joint that are pivoted to each other with a liquid passage connected together, the second movable joint has flexible inner joint and the first movable joint is configured with internal thread or external thread, the spherical shaped or spherical segment shaped side end portion at the wall of the first movable joint can be kept in offset way between the movable joint pit of the second movable joint, being the first aspect, and the movable joint head of the keeping element in the internal chamber of the first movable joint, being the other aspect, therein, the keeping element has the connecting bar in the second movable joint passing through the inserting hole of the first movable joint, the keeping element has the liquid passage of the first movable joint connected to the liquid passage of the second movable joint, and the movable joint head of the keeping element has spherical segment shape outer contour, an annular groove is configured at the largest external periphery area of the spherical segment shape movable joint head of the keeping element or the largest internal periphery area of the spherical shape or spherical segment shape side end portion of the first movable joint, and an annular sealing element is disposed in the annular groove.

In the existing mechanism, the first movable joint wall is disposed with a spherical shape or spherical segment shape end side portion, the movable joint head of the keeping element has a spherical shape outer contour, the second movable joint is disposed with movable joint pit coupling to the first movable joint, the first movable joint is kept in offset way between the second movable joint and the movable joint head, the first movable joint is positioned by the second movable joint and the movable joint head. On one hand, the structure is complicated, and it requires high to the parts precision, so that it costs high, on the other hand, it is inconvenient to assemble, it may fall off during connecting.

SUMMARY OF THE INVENTION

The present invention is provided with a connecting mechanism of a flexible pipe and an outlet device, which overcomes the disadvantages of the existing connecting mechanism.

The technical proposal of the present invention is that:

A connecting mechanism of a flexible pipe and an outlet device, comprising a pipe fixing seat (20) fixedly connected to a flexible pipe (10), an outlet fixing seat (30) fixedly connected to an outlet device and a joint (40), the joint (40) has a ball joint (41), water in the flexible pipe (10) is deflected to the outlet device by the pipe fixing seat (20) and the joint (40); wherein the joint (40) is fixedly connected to the outlet fixing seat (30) and the outlet fixing seat (30) is disposed with a self-lock surface (31) surrounding the ball joint (41); an end of the pipe fixing seat (20) is concaved with an assembly groove (21), the groove opening of the assembly groove (21) is protruding inwardly with an anti-off portion (22), the ball joint (41) is assembled in the assembly groove (21) by the elastic deformation of the end portion of the pipe fixing seat (20), the ball joint (41) is connected to the pipe fixing seat (20) by the anti-off portion (22), the ball joint (41) and the pipe fixing seat (20) form a universal connecting; the self-lock surface (31) further surrounds the end portion of the pipe fixing seat (20) to limit the deformation of the end portion of the pipe fixing seat (20) so as to achieve anti-off and self-lock.

In another preferred embodiment, the end portion of the pipe fixing seat (20) is disposed with cut slots, so that the end portion of the pipe fixing seat (20) forms a plurality of suspending sheets (23) arranged in the periphery with above said anti-off portion (22).

In another preferred embodiment, the self-lock surface (31) is a conical surface with small inside and big outside or a segment surface with small opening and large belly, the ball joint (41) is located in the chamber defined by the self-lock surface (31).

In another preferred embodiment, wherein the outlet fixing seat (30) is disposed with an assembly through hole (32), the inner wall of the assembly through hole (32) comprises the self-lock surface (31), the inner wall of the assembly through hole (32) is disposed with a protruding ring (33); the joint (40) comprises a base (42) fixedly connected to the ball joint (41), the base (42) is contacted with the end face of the protruding ring (33); the ball joint (41) passes through the protruding ring (33) and inserts to the chamber the self-lock surface (31) defines.

In another preferred embodiment, the outlet device is fixedly assembled in the assembly through hole (32) and the base (42) is fixedly disposed between the outlet device and the protruding ring (33).

In another preferred embodiment, the end portion of the pipe fixing seat (20) is protruding with a protrusion (24) on the external periphery surface, the protrusion (24) and the self-lock surface (31) cooperate to achieve anti-off and self-lock.

In another preferred embodiment, the joint (40) is disposed with a throughout joint waterway (43), the pipe fixing seat (20) is disposed with a fixing seat waterway (25) connected to the flexible pipe (10) and the assembly groove (21), water is deflected to the outlet device through the joint waterway (43) and the fixing seat waterway (25).

In another preferred embodiment, the groove wall of the assembly groove (21) comprises a ball wall with above groove opening fitting to the ball joint (41) and a column wall connected to the ball wall, the groove bottom of the assembly groove (21) is disposed with a fixing seat waterway (25) connected to the flexible pipe and the groove bottom is disposed with an annular surface surrounding the fixing seat waterway (25); a sealing ring (50) is provided between the outer wall of the ball joint (41), the column wall and the annular surface.

In another preferred embodiment, an outer sleeve (60) is further provided fixedly connected to the pipe fixing seat (20), the outer sleeve (60) surrounds the external periphery surface of the end portion of the outlet fixing seat (30), the outer sleeve (60) and the external periphery surface of the end portion of the outlet fixing seat (30) are arranged with space.

In another preferred embodiment, an encasing sleeve (70) is further provided, the end portion of the flexible pipe is tightly sleeved on the pipe fixing seat (20), the encasing sleeve (70) is disposed between the flexible pipe (10) and the outer sleeve (60) to abut against the flexible pipe (10) to make the end portion of the flexible pipe (10) tightly sleeved on the pipe fixing seat (20).

Compared to the existing known technology, the technical proposal of the present invention has advantages as follows:

The ball joint and the pipe fixing seat are coupled to realize universal connecting, the structure is simple and it has fewer parts, besides, it requires low to the manufacturing precision that reduces the manufacturing cost; the end portion of the pipe fixing seat can be elastically deformed that the ball joint can be assembled to the assembly groove, the anti-off portion is used to connect the ball joint and the pipe fixing seat, the self-lock surface surrounds the end portion of the pipe fixing seat to limit the deformation of the end of the pipe fixing seat to realize anti-off and self-lock, it avoids the ball joint from falling off from the pipe fixing seat, thus ensuring the ball joint and the pipe fixing seat connecting, the assembly is quick and convenient.

The end portion of the pipe fixing seat is disposed with cut slots that makes it with a plurality of suspending sheets peripherally arranged with space with the anti-off portion, so that it is convenient to assemble the ball joint to the groove.

The self-lock surface is a conical surface with small inside and big outside or a segment surface with small opening and large belly, the ball joint is located in the chamber defined by the self-lock surface, thus making sure that the self-lock surface can couple to the end portion of the pipe fixing seat when rotating universally and limiting the deformation of the end portion of the pipe fixing seat.

The joint comprises the base, which is contacted with the end face of the protruding ring, the ball joint passes through the protruding ring and inserts to the space defined by the self-lock surface, by the connecting of the ball joint and the pipe fixing seat and the base contacted with the end face of the protruding ring, the outlet fixing seat is connected to the pipe fixing seat, the structure is simple.

The outlet device is fixedly connected in the assembly through hole, and the base is disposed fixedly between the outlet device and the protruding ring, on one hand, the outlet device is fixedly connected to the outlet fixing seat, on the other hand, the joint can be connected to the outlet fixing seat, it enhances the connecting of the outlet fixing seat and the pipe fixing seat, and it is also assembled with convenience. The external periphery surface of the end portion of the pipe fixing seat is dispose with the protrusion, with the cooperation of the protrusion and the self-lock surface, it achieves anti-off and self-lock, on one hand, it reduces the friction force that makes it convenient to rotate, on the other hand, it makes the self-lock surface capable of coupling to the end portion of the pipe fixing seat.

The groove wall of the assembly groove comprises a ball wall and a column wall, the sealing ring is disposed between the outer wall of the ball joint, the column wall and the annular surface, the assembly groove has simple structure that it is convenient to manufacture and assemble, the sealing ring is positioned stably.

BRIEF DESCRIPTION OF THE DRAWINGS

The present invention will be further described with the drawings and the embodiments.

DETAILED DESCRIPTION OF THE EMBODIMENTS

Figure 1:
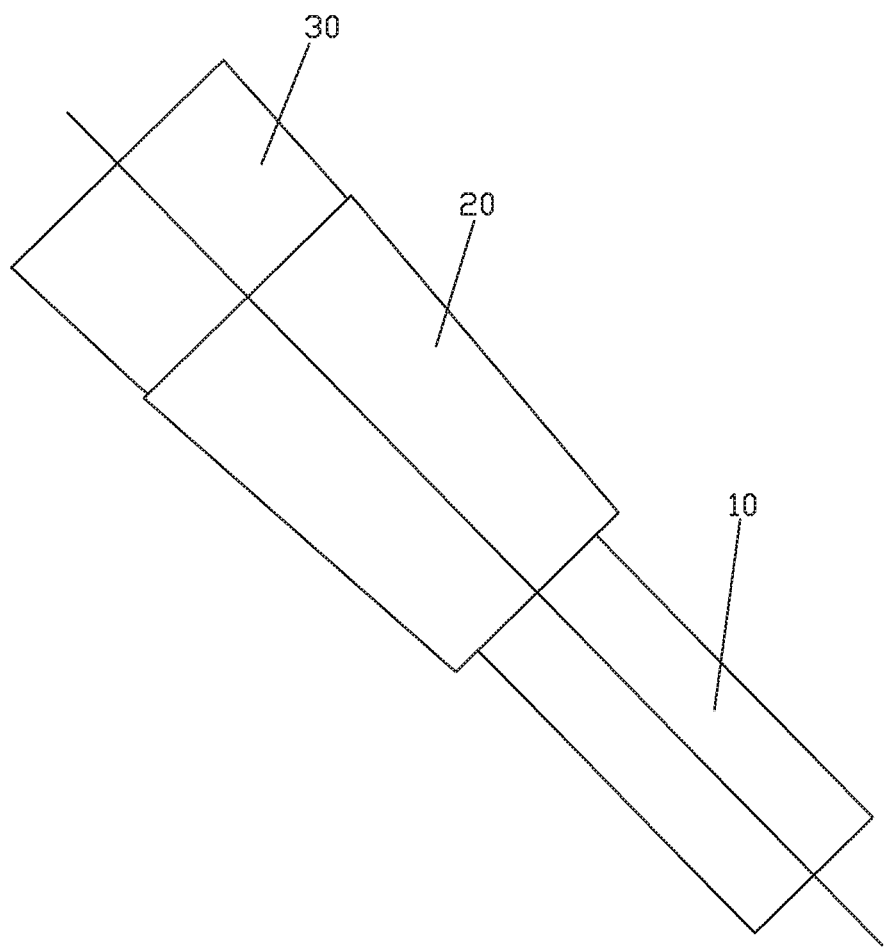
FIG. 1 illustrates a schematic diagram of the connecting mechanism of the present invention.
Figure 2:
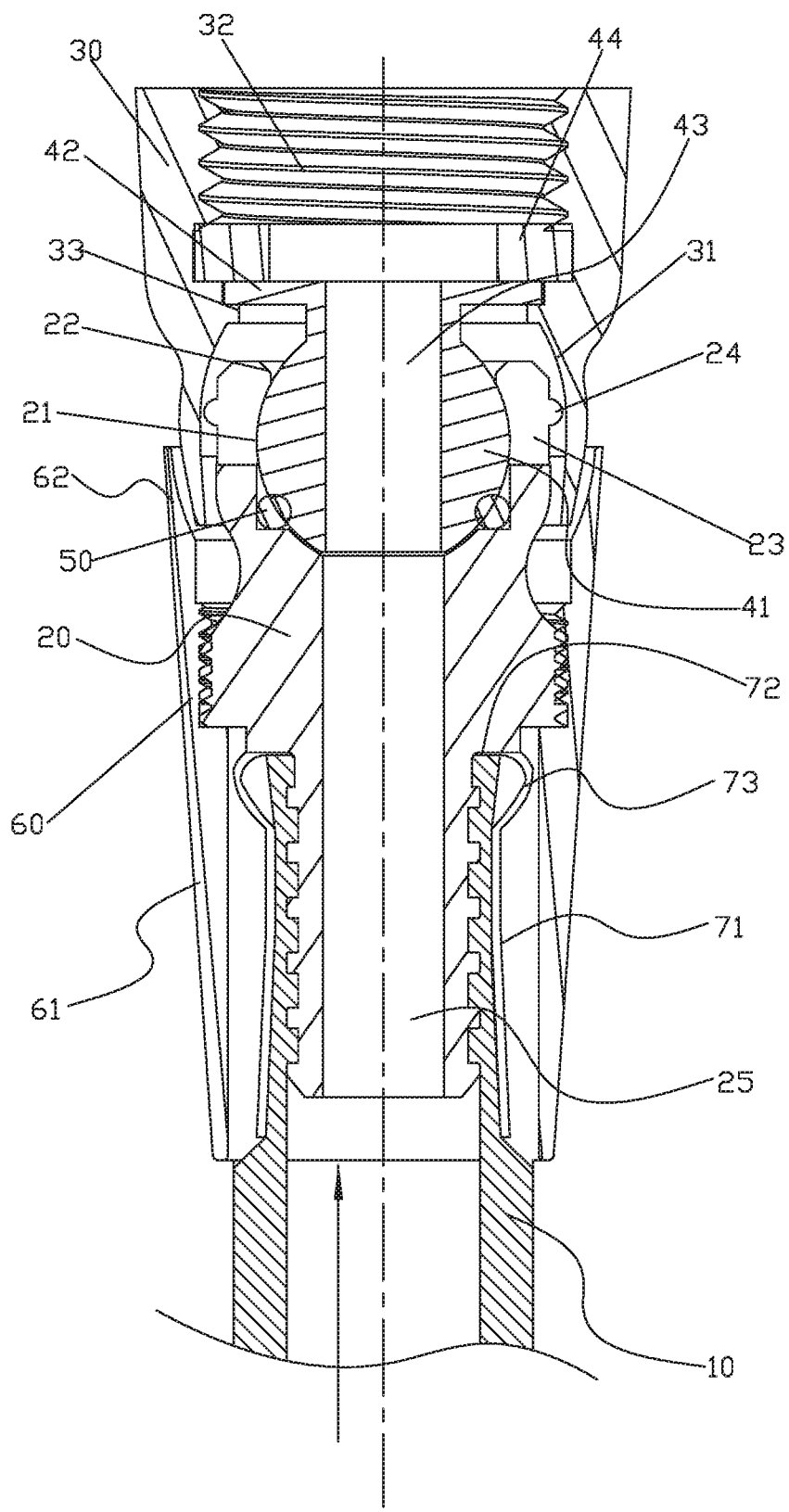
FIG. 2 illustrates a sectional diagram of the connecting mechanism of the first embodiment in resting state.
Figure 3:
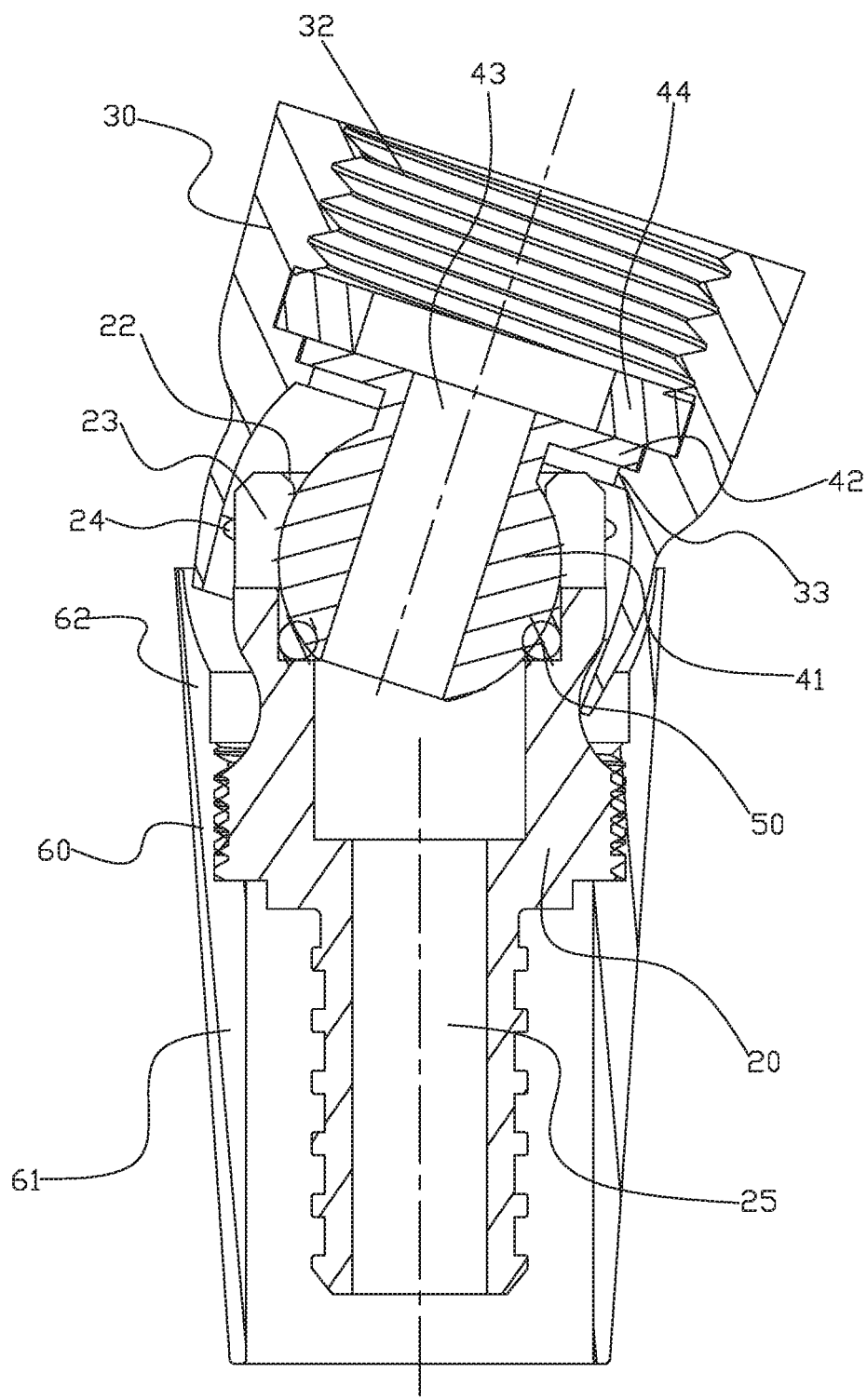
FIG. 3 illustrates a sectional diagram of the connecting mechanism of the first embodiment in swinging state.
Figure 4:
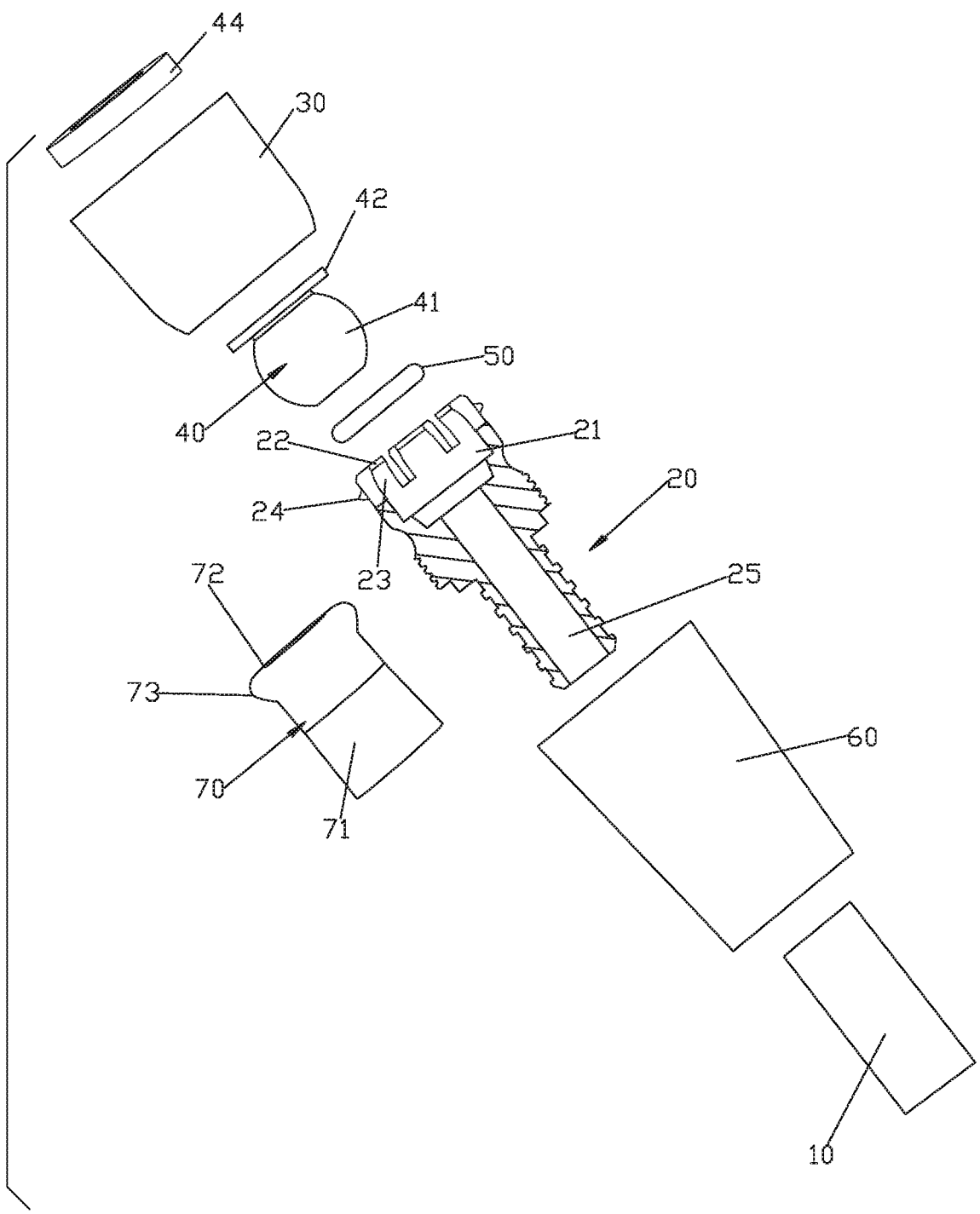
FIG. 4 illustrates a schematic diagram of the connecting mechanism of the first embodiment.

Please referring to FIGS. 1-4, a connecting mechanism of a flexible pipe and an outlet device comprises a pipe fixing seat 20 fixedly connected to the flexible pipe 10, an outlet fixing seat 30 fixedly connected to the outlet device, a joint 40, a sealing ring 50, an outer sleeve 60 and an encasing sleeve 70, water in the flexible pipe is deflected to the outlet device by the pipe fixing seat 20 and the joint 40.

The outlet fixing seat 30 is disposed with an assembly through hole 32, the inner wall of the assembly through hole comprises a self-lock surface 31 and an internal thread surface, the inner wall of the assembly through hole is protruding with a protruding ring 33, which is disposed between the self-lock surface 31 and the internal thread surface. The self-lock surface 31 is a segment surface with its axis coincide with the axis of the internal thread surface with small opening and large belly, the internal thread surface is coupled to the outlet device, such as the external thread of a hand shower head, so that the hand shower head can be threaded to the internal thread surface of the outlet fixing seat 30.

The joint 40 is disposed with a ball joint 41 and a base 42 fixedly connected to the ball joint 41, the revolution axis of the ball joint 41 is vertical to the base 42, the internal diameter of the protruding ring 33 is larger than the external diameter of the ball joint and smaller than the largest spacing of the base 42, for example, if the section of the base is square, the internal diameter of the protruding ring is smaller than the length of side of the square base, so that the ball joint 41 can pass through the protruding ring 33 to insert to the space defined by the self-lock surface 31 from the thread surface towards the self-lock surface, the base 42 is then contacted with the end face of the protruding ring 33. The external thread of the outlet device is threaded to the internal thread surface of the outlet fixing seat 30 and abuts against the base 42, which is fixedly disposed between the outlet device and the protruding ring 33, so that the joint 40, the outlet fixing seat 30 and the outlet device are fixedly assembled, the joint 40 is fixedly connected to the outlet fixing seat 30 and the self-lock surface of the outlet fixing seat 30 surrounds the ball joint 41, preferred, a spacer 44 is disposed between the end face of the outlet device and the base to ensure the sealing. The joint 40 is disposed with a throughout joint waterway 43, if the joint waterway 43 passes through the joint 40 along the revolution axis of the ball joint 41 of the joint 40, the joint waterway 43 is connected to the assembly hole 32 of the outlet fixing seat 30, and the joint waterway 43 is connected to the outlet device after it is assembled to the outlet fixing seat 30.

One end of the pipe fixing seat 20 is concaved with an assembly groove 21, the groove opening of which is protruding inwardly with an anti-off portion 22, the end of the pipe fixing seat 20 is disposed with cut slots to form suspending sheets 23 at the end portion of the pipe fixing seat 20 at the peripheral direction disposed with space with above mentioned anti-off portion 22, so that the suspending sheets 23 are elastically deformed by force, the ends of the suspending sheets surround and form above mentioned groove opening, the ends of the suspending sheets are protruding inwardly to form an upturned catch, which forms above mentioned anti-off portion 22.

Putting the ball joint 41 straight at the assembly groove 21 and putting force to the both to make them move close, the ball joint 41 abuts against the upturned catch of the suspending sheets 23 to make the suspending sheets 23 elastically deformed outwardly, so that the ball joint 41 can be assembled into the assembly groove 21, then the suspending sheets 23 returns to their nature state, with the anti-off portion 22, the ball joint 41 is connected to the pipe fixing seat 20 that they would not divide, the ball joint 41 and the pipe fixing seat 20 form a universal connecting. After the assembling, the self-lock surface 31 further surrounds the end portion of the pipe fixing seat 20 to limit the deformation of the end portion of the pipe fixing seat 20, so that the end portion can be kept in it's natural state or light deforming state like the suspending sheets, it avoids the ball joint falling off from the assembly groove, thus achieving anti-off and self-lock. In this embodiment, the protrusion in natural state or light deforming state and the self-lock surface have clearance therebetween, the diameter of the protrusion in off state is larger than the diameter of the self-lock surface. Preferred, the external periphery surface of the suspending sheets of the pipe fixing seat 20 is disposed with protrusion 24, which is a protrusion dot or a protrusion rib, the protrusions of all suspending sheets are arranged peripherally with space, with the cooperation of protrusions and the self-lock surface 31, it achieves anti-off and self-lock. In detailed, the self-lock surface 31 abuts against the protrusions 24 when the connecting mechanism is in resting state. Preferred, during assembling the ball joint to the assembly groove, the largest external diameter of the end portion of the pipe fixing seat is coupled to that of the self-lock surface, so that the self-lock surface is coupled to the end portion of the pipe fixing seat 20 for anti-off and self-lock after the ball joint is assembled to the assembly groove.

The pipe fixing seat 20 is disposed with a fixing seat waterway 25 connecting the flexible pipe 10 and the assembly groove 21, the other end face of the pipe fixing seat 20 is concaved with a through groove connected to the assembly groove 21, the through groove form the fixing seat waterway 25, the water in the flexible pipe 10 is deflecting to the outlet device by the joint waterway 43 and the fixing seat waterway 25. The groove wall of the assembly groove 21 comprises a ball wall with above groove opening fitting to the ball joint 41 and a column wall connected to the ball wall, the groove bottom is disposed with an annular surface surrounding the fixing seat waterway 25; the sealing ring 50 is provided between the outer wall of the ball joint 41, the column wall and the annular surface. The suspending sheets are configured on the ball wall.

The outer sleeve 60 is disposed with a thread portion, the outer sleeve 60 is threaded to the outer side of the pipe fixing seat 20 by the thread portion, the outer sleeve 60 has a first surrounding portion 61 and a second surrounding portion 62 respectively disposed at two sides of the thread portion. The end portion of the flexible pipe 10 is tightly sleeved on the outer side of the pipe fixing seat 20, the first surrounding portion 61 surrounds the end portion of the flexible pipe 10, the an annular chamber is formed between the first surrounding portion 61 and the end portion of the flexible pipe 10, that it is benefit for the flexible pipe to reposition smoothly and it also avoids the dirt. The second surrounding portion 62 forms like a trumpet, which surrounds the external periphery surface of the end portion of the outlet fixing seat 30, the second surrounding portion 62 and the external periphery surface of the end portion of the outlet fixing seat 30 are arranged with space, the external periphery surface of the end portion of the outlet fixing seat 20 is a revolution surface, which has the external diameter gradually decreased from the head to the rear.

The encasing sleeve 70 is disposed between the flexible pipe 10 and the first surrounding portion 61 of the outer sleeve 60, it is located in the annular chamber to abut the flexible pipe 10, so that the end portion of the flexible pipe 10 is tightly sleeved on the outer side of the pipe fixing seat 20. The encasing sleeve 70 comprises an annular wall 71, an end face wall 72 and a connecting wall 73 extending from the annular wall 71 to the end face wall 72 connected to the external periphery edge of the end face wall 72, the connecting wall 73 forms a protruding shape. When assembling, the annular wall 71 is sleeved on the flexible pipe, the end face wall 72 abuts between the end face of the flexible pipe and the end face of the external protruding ring of the pipe fixing seat, the annular wall 71 and the end face wall 72 are positioned when assembling, with the limitation of the space distance of the annular chamber, the encasing sleeve 70 can produce a force to tightly sleeve on the flexible pipe, thus enhancing the connecting strength of the flexible pipe and the pipe fixing seat and the sealing performance therebetween.

Figure 5:
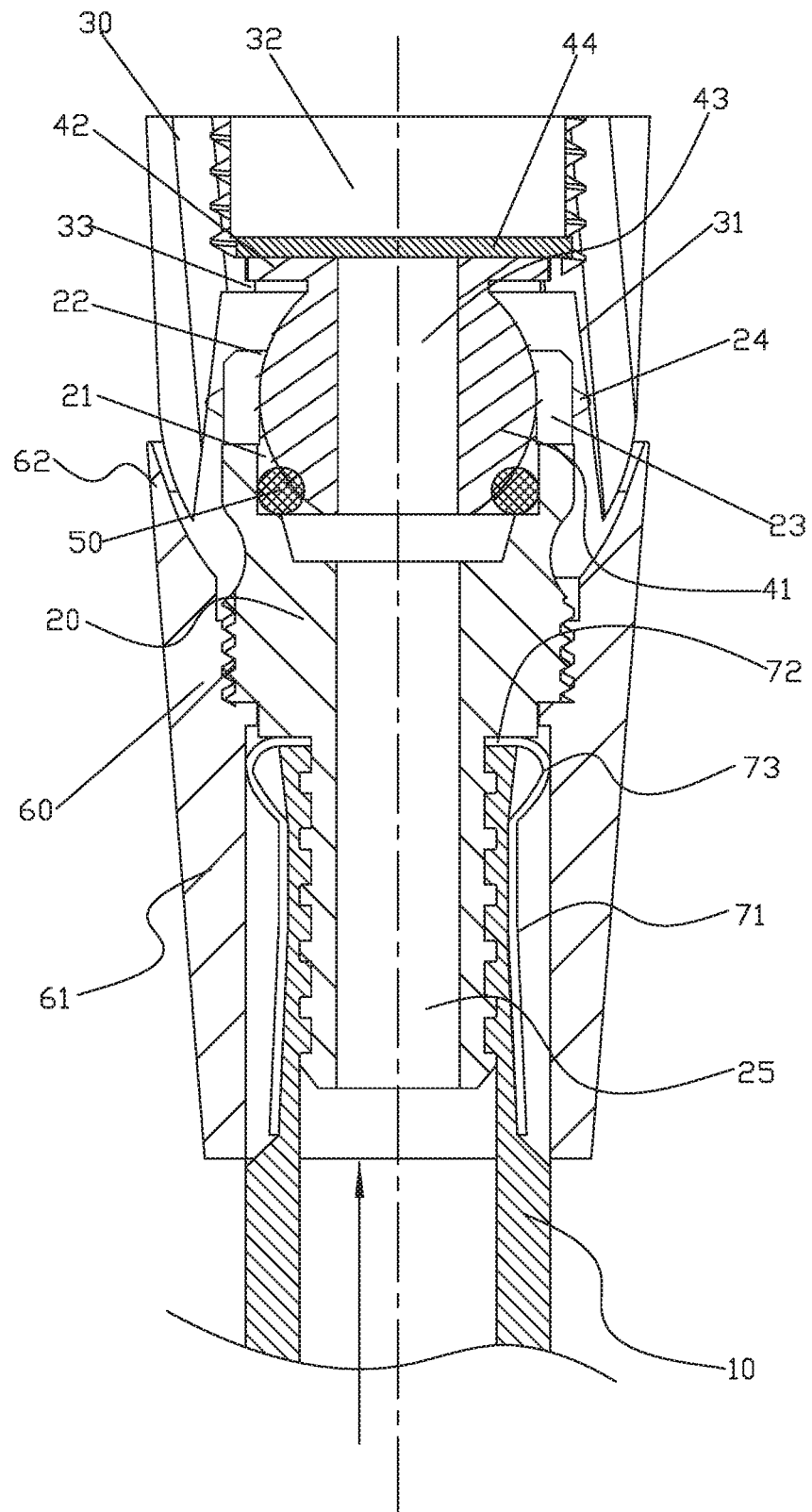
FIG. 5 illustrates a sectional diagram of the connecting mechanism of the second embodiment.

Please referring to FIG. 5, a second embodiment of the present invention differs from the first embodiment in that: the self-lock surface 21 is a conical surface with small inside and large outside.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A connecting mechanism of a flexible pipe, comprising:
a pipe fixing seat fluidly connected to a flexible pipe;
an outlet fixing seat fixedly connected to a water outlet; and
a joint fluidly connected to the water outlet, the joint having a ball joint, wherein:
the outlet fixing seat has an assembly through hole;
an inner wall of the assembly through hole comprises a self-lock surface and a protruding ring;
the joint comprises a base fixedly connected to the ball joint;
the base contacts a first face of the protruding ring facing away from the self-lock surface;
the ball joint passes through the protruding ring and into a chamber defined by the self-lock surface;
an end of the pipe fixing seat is provided with an assembly groove;
an inlet diameter of the assembly groove is smaller than a maximum external diameter of the ball joint;
a groove opening of the assembly groove protrudes inwardly with an anti-off portion;
the ball joint is held in the assembly groove by elastic deformation of an end portion of the pipe fixing seat;
the ball joint is connected to the pipe fixing seat by the anti-off portion;
the ball joint and the pipe fixing seat form a universal connection; and the self-lock surface further surrounds the end portion of the pipe fixing seat to limit deformation of the end portion of the pipe fixing seat so as to achieve an anti-off and self-lock connection.

2. The connecting mechanism of a flexible pipe according to claim 1, wherein:
the end portion of the pipe fixing seat has cut slots to obtain a plurality of suspending sheets arranged in a periphery of the anti-off portion.

3. The connecting mechanism of a flexible pipe according to claim 2, wherein:
the self-lock surface is a conical surface or a segment portion of an inner surface of a ball; and
the ball joint is disposed in the chamber defined by the self-lock surface.

4. The connecting mechanism of a flexible pipe according to claim 2, wherein:
an external periphery surface of the end portion of the pipe fixing seat has a protrusion; and
the protrusion and the self-lock surface cooperate to achieve the anti-off and self-lock connection.

5. The connecting mechanism of a flexible pipe according to claim 2, wherein:
The joint has a throughout joint waterway; and
the pipe fixing seat has a fixing seat waterway connected to the flexible pipe and the assembly groove.

6. The connecting mechanism of a flexible pipe according to claim 2, wherein:
a groove wall of the assembly groove comprises a ball wall having the groove opening fitting to the ball joint and a column wall connected to the ball wall;
a groove bottom of the assembly groove has a fixing seat waterway connected to the flexible pipe, the groove bottom having an annular surface surrounding the fixing seat waterway; and
a sealing ring is provided between an outer wall of the ball joint, the column wall and the annular surface.

7. The connecting mechanism of a flexible pipe according to claim 2, further comprising:
an outer sleeve fixedly connected to the pipe fixing seat, wherein:
the outer sleeve surrounds an external periphery surface of an end portion of the outlet fixing seat; and
the outer sleeve and the external periphery surface of the end portion of the outlet fixing seat are arranged with space therebetween.

8. The connecting mechanism of a flexible pipe according to claim 7, further comprising:
an encasing sleeve, wherein:
an end portion of the flexible pipe is sleeved on the pipe fixing seat; and
the encasing sleeve is disposed between the flexible pipe and the outer sleeve to abut the flexible pipe to cause the end portion of the flexible pipe to be sleeved on the pipe fixing seat.

9. The connecting mechanism of a flexible pipe according to claim 2, wherein:
each of the plurality of suspending sheets is configured to deform elastically in response to force to admit the ball joint into the assembly groove and then to return to a natural state.

10. The connecting mechanism of a flexible pipe according to claim 1, wherein:
the self-lock surface is a conical surface or a segment portion of an inner surface of a ball; and
the ball joint is disposed in the chamber defined by the self-lock surface.

11. The connecting mechanism of a flexible pipe according to claim 1, wherein:
an external periphery surface of the end portion of the pipe fixing seat has a protrusion; and
the protrusion and the self-lock surface cooperate to achieve the anti-off and self-lock connection.

12. The connecting mechanism of a flexible pipe according to claim 1, wherein:
the joint has a throughout joint waterway; and
the pipe fixing seat has a fixing seat waterway connected to the flexible pipe and the assembly groove.

13. The connecting mechanism of a flexible pipe according to claim 1, wherein:
a groove wall of the assembly groove comprises a ball wall having the groove opening fitting to the ball joint and a column wall connected to the ball wall;
a groove bottom of the assembly groove has a fixing seat waterway connected to the flexible pipe, the groove bottom having an annular surface surrounding the fixing seat waterway; and
a sealing ring is provided between an outer wall of the ball joint, the column wall and the annular surface.

14. The connecting mechanism of a flexible pipe according to claim 1, further comprising:
an outer sleeve fixedly connected to the pipe fixing seat, wherein:
the outer sleeve surrounds an external periphery surface of an end portion of the outlet fixing seat; and
the outer sleeve and the external periphery surface of the end portion of the outlet fixing seat are arranged with space therebetween.

15. The connecting mechanism of a flexible pipe according to claim 14, further comprising:
an encasing sleeve, wherein:
an end portion of the flexible pipe is sleeved on the pipe fixing seat; and
the encasing sleeve is disposed between the flexible pipe and the outer sleeve to abut the flexible pipe to cause the end portion of the flexible pipe to be sleeved on the pipe fixing seat.

16. A connecting mechanism of a flexible pipe, comprising:
a pipe fixing seat fluidly connected to a flexible pipe;
an outlet fixing seat fixedly connected to a water outlet; and
a joint fluidly connected to the water outlet, the joint having a ball joint, wherein:
the joint is fixedly connected to the outlet fixing seat;
the outlet fixing seat has a self-lock surface surrounding the ball joint;
an end of the pipe fixing seat is provided with an assembly groove;
an inlet diameter of the assembly groove is smaller than a maximum external diameter of the ball joint;
a groove opening of the assembly groove protrudes inwardly with an anti-off portion;
the ball joint is held in the assembly groove by elastic deformation of an end portion of the pipe fixing seat;
the ball joint is connected to the pipe fixing seat by the anti-off portion;
the ball joint and the pipe fixing seat form a universal connection;
the self-lock surface further surrounds the end portion of the pipe fixing seat to limit deformation of the end portion of the pipe fixing seat;
an external periphery surface of the end portion of the pipe fixing seat has a protrusion; and the protrusion and the self-lock surface cooperate to achieve an anti-off and self-lock connection.

17. The connecting mechanism of a flexible pipe according to claim 16, wherein:
the end portion of the pipe fixing seat has cut slots to obtain a plurality of suspending sheets arranged in a periphery of the anti-off portion.

18. A connecting mechanism of a flexible pipe, comprising:
a pipe fixing seat fluidly connected to a flexible pipe;
an outlet fixing seat fixedly connected to a water outlet; and
a joint fluidly connected to the water outlet, the joint having a ball joint, wherein:
the joint is fixedly connected to the outlet fixing seat;
the outlet fixing seat has a self-lock surface surrounding the ball joint;
an end of the pipe fixing seat is provided an assembly groove;
an inlet diameter of the assembly groove is smaller than a maximum external diameter of the ball joint;
a groove opening of the assembly groove protrudes inwardly with an anti-off portion;
the ball joint is held in the assembly groove by elastic deformation of an end portion of the pipe fixing seat;
the ball joint is connected to the pipe fixing seat by the anti-off portion;
the ball joint and the pipe fixing seat form a universal connection;
the self-lock surface further surrounds the end portion of the pipe fixing seat to limit deformation of the end portion of the pipe fixing seat;
the end portion of the pipe fixing seat has cut slots to obtain a plurality of suspending sheets arranged in a periphery of the anti-off portion;
a groove wall of the assembly groove comprises a ball wall having the groove opening fitting to the ball joint and a column wall connected to the ball wall;
a groove bottom of the assembly groove has a fixing seat waterway connected to the flexible pipe, the groove bottom having an annular surface surrounding the fixing seat waterway; and
a sealing ring is provided between an outer wall of the ball joint, the column wall and the annular surface.

\* \* \* \* \*